UNITED STATES PATENT OFFICE.

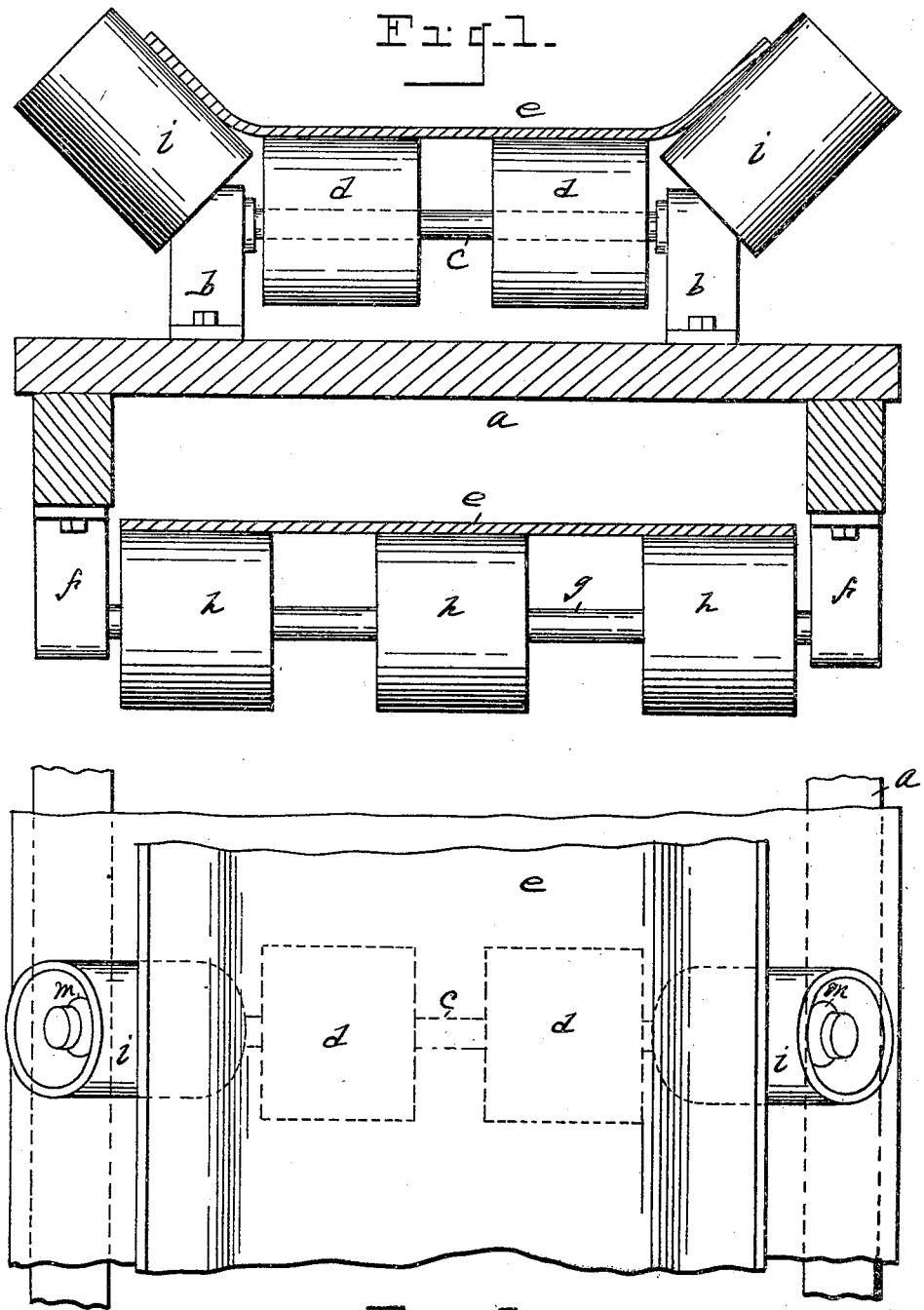

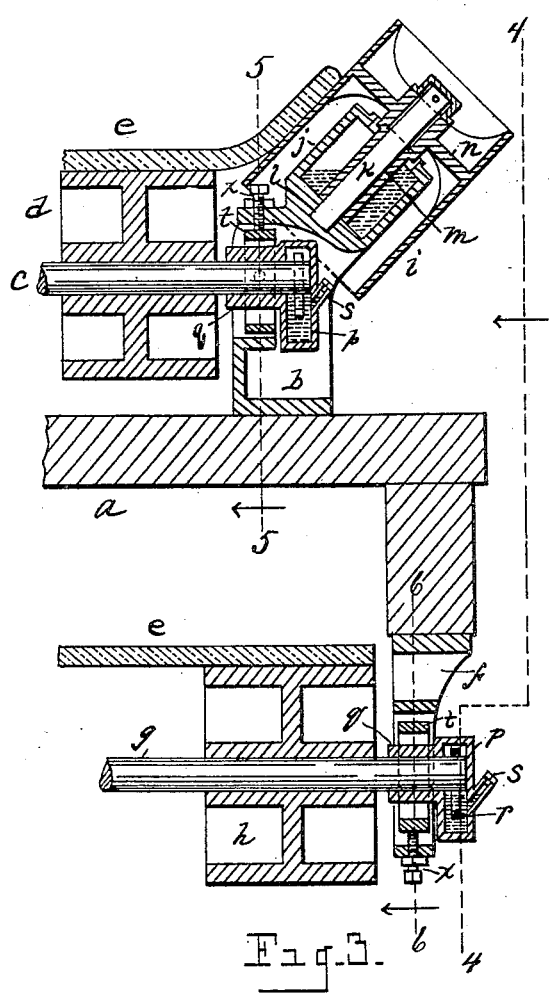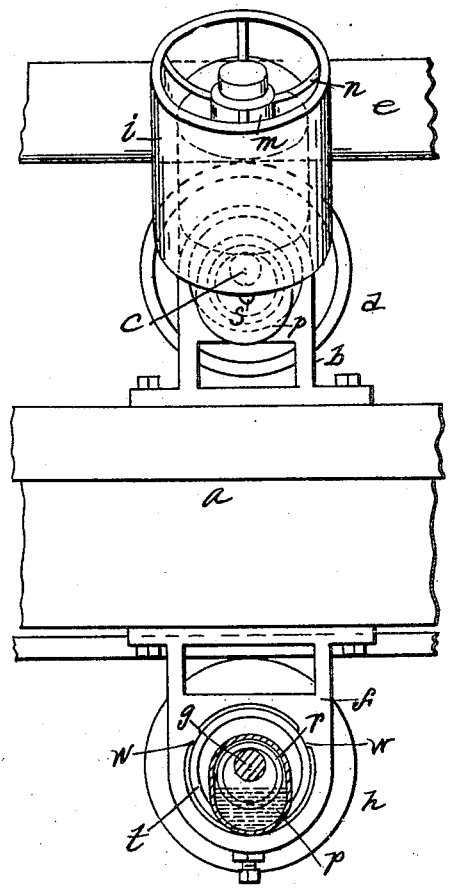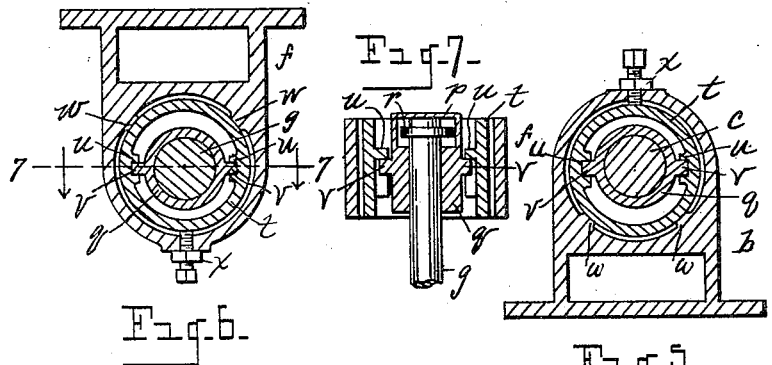

WILLIAM E. BEE, OF DETROIT, MICHIGAN.

BELT-CONVEYER MECHANISM.

No. 800,786.      Specification of Letters Patent.      Patented Oct. 3, 1905.

Application filed October 31, 1904. Serial No. 230,658.

*To all whom it may concern:*

Be it known that I, WILLIAM E. BEE, a citizen of the United States, residing at Detroit, county of Wayne, State of Michigan, have invented a certain new and useful Improvement in Belt-Conveyer Mechanism, of which the following is a specification, reference being had to the accompanying drawings, which form a part of this specification.

My invention has for its object certain new and useful improvements in belt-conveyer mechanism; and it consists of the construction, combination, and arrangement of devices hereinafter described and claimed, and illustrated in the accompanying drawings, in which—

Figure 1 is a view in vertical section, showing features of the device in elevation. Fig. 2 is a plan view of the same. Fig. 3 is a view in vertical section through portions of the conveyer mechanism. Fig. 4 is a view on the line 4 4, Fig. 3, showing parts in vertical section and other features in end elevation. Fig. 5 is a view in section on the line 5 5, Fig. 3. Fig. 6 is a view in section on the line 6 6, Fig. 3. Fig. 7 is a view in horizontal section on the line 7 7, Fig. 6.

One of the essential features of my invention is to provide concentrator mechanism for belt conveyers which shall be practically self-alining, which shall only need oiling at long intervals; also, to construct a concentrator for belt conveyers wherein there shall be no leakage or dripping of oil or grease upon the conveyer-belt or upon any material carried thereby; also, to provide bearings for various portions of said mechanism made self-oiling, oscillatory, and self-adjusting or self-locating.

My invention also includes the general features of construction herein shown and described.

I carry out my invention as follows:

In the drawings, $a$ represents a stand or other suitable support upon which are mounted bearings $b\ b$, carrying the shaft $c$ of the carrier roller or rollers $d$, upon which the conveyer-belt $e$ travels. To said stand or support $a$ are also secured bearings $f\ f$, carrying the shaft $g$ of the supporting or return roller or rollers $h$. The shafts $c$ and $g$ may be provided with one or more rollers, as may be preferred. Troughing-rollers are indicated at $i\ i$, which may be set at any desired angle to the shaft $c$. Each of the bearings $b$ is provided with an oil well or case, (indicated at $j$,) the same being preferably formed integrally with the corresponding bearing. Said oil case or well is provided with a spindle (indicated at $k$) preferably cast into the oil-case, at one end thereof, as indicated at $l$. Each of the troughing-pulleys $i$ is cast with a sleeve or hub (indicated at $m$) to fit over the corresponding spindle $k$, the roller and the hub being connected by a web $n$. The oil-case is spaced from the hub or sleeve to form an oil-chamber, as shown. The upper end of the oil-case is formed with an opening about the hub of the roller, and it will be seen that oil may be supplied to said oil-chamber up to a level with the base of the said opening, as indicated by the horizontal lines in said oil-chamber. Oil may be supplied when needed to the oil-chamber through the opening in the oil-case or otherwise, as may be preferred. The oil may be passed from said oil-chamber to lubricate the corresponding spindle $k$ in any suitable manner, as at the lower end of the hub. The hub of the troughing-roller may be readily removed from the spindle when it may become necessary to do so. It will be seen that oil cannot drip over said oil-chamber and that it is capable of containing a sufficient amount of oil to last for a long period of time without refilling.

To oil the extremities of the shaft $c$, my invention contemplates providing an oil-chamber $p$, provided with a sleeve $q$ to receive the corresponding end of the shaft $c$, the end of the shaft extending into the upper portion of the oil-chamber formed within the oil-case $p$, a ring $r$ being mounted upon the end of the shaft and depending into the oil-chamber. Said oil-chamber may be supplied with oil in any suitable manner, as through a feed-inlet $s$. About the sleeve $q$ I provide an outer case $t$, provided with interior shouldered sockets $u$, the sleeve $q$ being provided with spurs $v$ to fit into said sockets. It will be perceived that since the spurs $v$ fit into the shouldered sockets $u$ the corresponding sleeve will be prevented from slipping off from the end of the shaft. The bearing is preferably formed with contact-points $w$, the bearings being spaced, preferably, from the case $t$ between said points. The case $t$, it will be perceived, is made adjustable within the bearings or oscillatory therein, the same being held in given position by means of a set-screw $x$, passing through the bearing. The construction of the oiling mechanism with the adjustable case $p$ is preferably made the same for the extremities of both the shaft $c$ and $g$ and are herewith shown and lettered the same, with the exception that the set-screw $x$ for the oiling mechanism of the shaft $c$ is at the top of the bearing, while the set-screw in the mechanism for oiling the lower bearing is at the bottom of the bearing.

It will be perceived that the lower ends of the spindle $k$ and of the hub $m$ are submerged in the oil within the oil-chamber, so that the parts will be self-oiling.

It will be perceived also by reference to Fig. 2 that the troughing-rollers have their centers in the same vertical plane as the longitudinal center of the shaft $c$. While the concentrator-rollers $i$ are shown projecting upward and outward and at an angle to the shaft $c$, they may extend horizontally within the scope of my invention.

The upper ends of the spindles $k$, it will be perceived, are covered by the end of the adjacent hub $m$.

What I claim as my invention is—

1. In a conveyer-belt mechanism the combination of a bearing, an oil-case forming an oil-chamber supported upon said bearing, a spindle supported upon said bearing within said oil-chamber, and a troughing-roller provided with a sleeve or hub engaged upon said spindle.

2. A conveyer-belt roller having in combination therewith an upwardly-projecting oil-case forming an interior oil-chamber open at its upper end and provided with a spindle projecting upward through said oil-chamber, said roller constructed with a sleeve or hub engaged upon the spindle, said oil-chamber arranged to contain a supply of oil to submerge the lower extremities of the spindle and of the hub.

3. A conveyer-belt mechanism having in combination an oil-case forming an interior oil-chamber, a spindle projecting through the oil-chamber, a support for the oil-case and spindle, and a troughing-roller constructed with a sleeve or hub engaged upon said spindle, said oil-case spaced from said sleeve.

4. In a conveyer-belt mechanism the combination of a bearing, an oil-case supported upon said bearing open at its outer end, a spindle supported upon the bearing, and a troughing-roller constructed with a sleeve or hub engaged upon said spindle, said oil-case spaced from said sleeve to form an oil-chamber about the sleeve.

5. In a conveyer-belt mechanism the combination of a supporting-roller, bearings therefor, an oil-case supported upon each of said bearings, a spindle supported upon each of said bearings, and a troughing-roller constructed with a sleeve or hub engaged upon each of said spindles, the supporting-roller and the troughing-rollers being in the same vertical plane.

6. A conveyer-belt roller having in combination therewith an oil-case forming an interior oil-chamber open at its outer end, a spindle within the oil-chamber, and a support for said oil-case and spindle, said roller constructed with a sleeve or hub projecting through the open end of the oil-case and engaged upon said spindle.

7. In a belt-conveyer mechanism a fixed support provided with an oil-case forming an oil-chamber, and with a spindle, and a troughing-roller provided with a sleeve or hub projecting into said oil-chamber to receive said spindle, said oil-case spaced from said sleeve or hub.

In testimony whereof I have signed this specification in the presence of two subscribing witnesses.

WILLIAM E. BEE.

Witnesses:
N. S. WRIGHT,
M. L. SIMMONS.